Nov. 17, 1953
R. C. BAIRD
2,659,451
CENTRIFUGAL GAS CLEANER
Filed Aug. 18, 1950
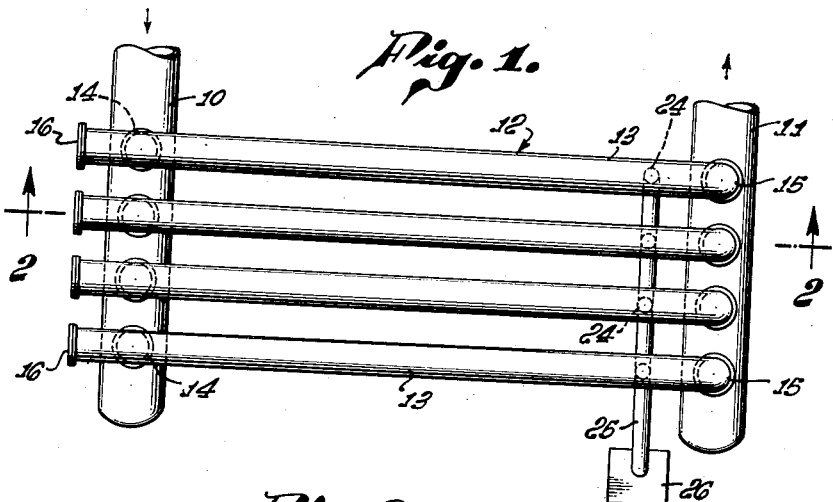
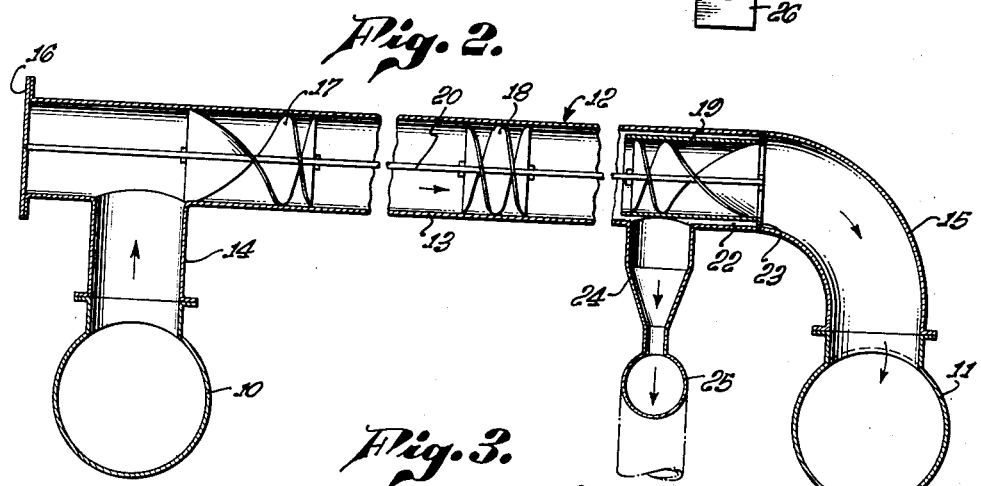
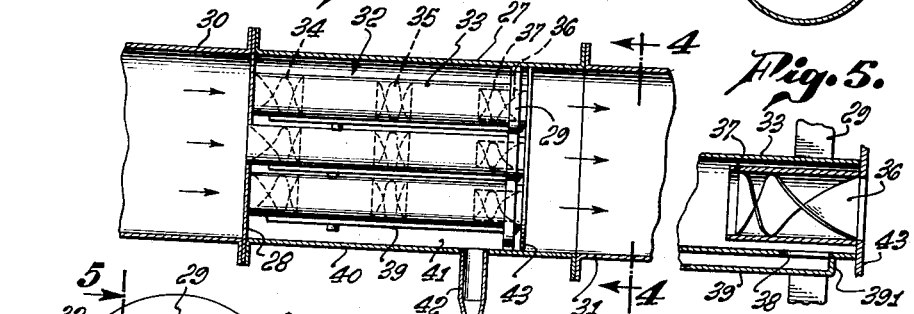
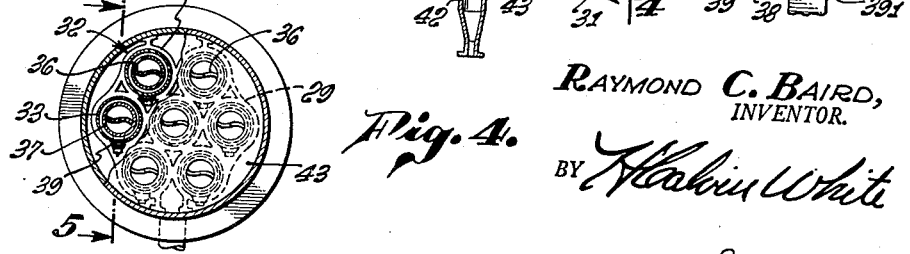
Raymond C. Baird,
INVENTOR.
BY H. Calvin White
ATTORNEY.

Patented Nov. 17, 1953

2,659,451

UNITED STATES PATENT OFFICE 2,659,451

CENTRIFUGAL GAS CLEANER

Raymond C. Baird, Los Angeles, Calif., assignor to The Fluor Corporation, Ltd., Los Angeles, Calif., a corporation of California Application August 18, 1950, Serial No. 180,218

1 Claim. (Cl. 183—80)

This invention has to do generally with improved apparatus for separating liquid entrainment from gas streams, such for example as wet natural gas, and is directed particularly to various novel features rendering the invention capable of low cost manufacture and field installation in wide capacity ranges, as well as efficient moisture removal.

Generally contemplated is a separator assembly employing a pair of gas inlet and outlet headers interconnected by individual relatively small diameter pipes in such number and arrangement as may be required to accommodate, for purposes of efficient moisture removal and within permissible pressure drop ranges, the rate of gas flow through the headers.

Segregation of the liquid out of the divided gas streams flowing through the several interconnecting pipes, is accomplished by providing within each pipe a helical or spiral vane series acting to require the gas to follow a spiral path of flow at angular or swirl velocities sufficiently high to effectively throw the entrainment out against the wall of the tube. For reasons that will later appear, it is preferred to direct the gas entering each pipe to a helical course of flow at progressively increasing circular, i. e. angular, velocity and to a maximum that may be maintained to a location near the liquid draw-off outlet extent of the pipe, where the swirl velocity is progressively reduced down to the point of discharge into the outlet header.

The invention further contemplates removal from the several pipes of liquid separately from the outlet gas, and by way of a system of drains so connected as to enable the total liquid to be run off in a single drain line or header.

All the objects and features of the invention, together with the details of certain typical embodiments, will be understood fully from the following description of the accompanying drawing, in which:

Fig. 1 is a plan view illustrating one embodiment of the invention;

Fig. 2 is an enlarged sectional view taken on line 2—2 of Fig. 1;

Fig. 3 is a view partly in section, illustrating a variational form of the invention;

Fig. 4 is a section taken on line 4—4 of Fig. 3; and

Fig. 5 is an enlarged section on line 5—5 of Fig. 4.

Referring first to Fig. 1, the gas cleaner assembly is shown to comprise a wet gas inlet header 10 and a dry gas outlet header 11 both of relatively large diameter and extending in spaced parallel relation. The headers 10 and 11 are interconnected by separator units 12, the number of which is determined in accordance with the total gas throughput from header to header. Merely as illustrative, the assembly of Fig. 1 is shown to comprise four tubular separator units 12 interconnecting the headers.

Each unit 12 is shown to comprise a pipe 13 elevated above and connected respectively with the inlet and outlet headers 10 and 11 by way of pipes 14 and 15. Above header 10, the inlet end of each pipe 13 is closed by a cover 16 which is removable to permit direct line access to the interior of the pipe, as for insertion and withdrawal of the later described vane assembly.

Each pipe 13 contains a series of spiral baffles or vanes preferably arranged in spaced sections 17, 18 and 19 which may be mounted about a central rod 20 to facilitate insertion and removal of all the vane sections together within the pipe. The vane section 17 preferably is designed to impart to the gas stream progressively increasing swirling or angular velocity up to a maximum reached at the point of departure of the gas from the vane section 17 in flowing to the next intermediate vane section 18. Accordingly, the vane 17 is shown to have progressively decreasing lead in the direction of the gas flow, so that the gas undergoes a corresponding and progressive increase in angular velocity. The maximum of that velocity is substantially maintained by providing the intermediate vane sections 18 at intervals spaced sufficiently close to assure a constant condition of swirling gas flow up to the vane section 19. As illustrated, the latter has a progressively increasing lead toward the outlet end of the pipe, with the result that the angular velocity of the gas is progressively reduced before the gas enters pipe 15 and the outlet header 11. By eliminating inertia effects otherwise to be encountered by the use of minimum lead bends in the sections 17 and 19, the described progressively changing leads have the effect of materially reducing the pressure drop taken by the gas in flowing through the vane series.

Flowing through the pipe 12, the gas is subjected to a swirling or angular velocity sufficiently high to cause centrifugal segregation of liquid entrainment of the gas outwardly against the wall of the pipe. The liquid so segregated advances into space 22 between the outlet portion of the pipe and an inside baffle tube 23, thus becoming isolated from contact with and possible entrainment by the leaving gas. From space 22, the liquid drains through outlet 24 into a header 25 leading to the sump 26. As illustrated in Fig. 1 the header 25 serves as a common liquid drain line for all the units 12.

Fig. 3 illustrates a variational form of the invention in accordance with which the individual separating units are accommodated in longitudinal alinement with the inlet and outlet gas headers. Here a shell 27 containing a tube sheet 28 is received between and in alinement with a large diameter wet gas pipe or header 30 and the dry gas outlet header 31. Expanded into or otherwise secured within sheet 28 are a plurality of separator units 32 corresponding to the previously described units 12. That is to say, each unit 32 comprises a pipe 33 containing vane sections 34, 35 and 36 corresponding respectively to vanes 17, 18 and 19 in Fig. 2. The forward ends of the pipes 33 may be suitably supported for removal from shell 27, as by a spider or strap arrangement 29. Liquid drainage from the space between the outlet end portion of each pipe 33 and the inside baffle tube 37, corresponding to tube 22 in Fig. 2, occurs through an opening 38 into a drain channel 39 applied to the underside of the pipe and having a discharge spout 40 spaced reversely to the directing of the gas flow from the forward closed end 391 of the channel. As shown in Figs. 3 and 4, the separated liquid flows from all the units into chamber 41 within the shell 27, for removal through the bottom drain 42 located at the upstream side of the annular dam ring 43.

I claim:

Gas cleaning apparatus comprising a gas inlet header and a gas outlet header, said headers being arranged in spaced parallel relation, a plurality of pipes extending between and interconnecting the headers for divided parallel flow of the gas from one to the other thereof, said pipes being positioned above one of the headers and having ends through which the insides of the pipes are accessible, removable closures for said ends of the pipes, baffle means within each of said pipes directing the gas in a swirling course of flow therein to centrifugally segregate entrainment out of the gas, and means for withdrawing the segregated entrainment from the pipes.

RAYMOND C. BAIRD.

References Cited in the file of this patent

UNITED STATES PATENTS

| Number | Name | Date |
| --- | --- | --- |
| 1,372,714 | Milliken | Mar. 29, 1921 |
| 1,970,077 | Collins | Aug. 14, 1934 |
| 2,413,324 | Holzwarth | Dec. 31, 1946 |
| 2,506,298 | Griffin | May 2, 1950 |

FOREIGN PATENTS

| Number | Country | Date |
| --- | --- | --- |
| 13,279 | Great Britain | June 13, 1903 |
| 555,908 | Great Britain | Sept. 13, 1943 |
| 962,402 | France | Dec. 12, 1949 |